(12) United States Patent
Scarr et al.

(10) Patent No.: US 10,921,150 B2
(45) Date of Patent: *Feb. 16, 2021

(54) NAVIGATION APPLICATION PROGRAMMING INTERFACE

(71) Applicant: Google LLC, Mountain View, CA (US)

(72) Inventors: Joseph Laurence Scarr, Camperdown (AU); Luke David Macpherson, Pyrmont (AU); Jacob Alexander Simionato, Summer Hill (AU)

(73) Assignee: Google LLC, Mountain View, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/502,444

(22) Filed: Jul. 3, 2019

(65) Prior Publication Data
US 2019/0323853 A1    Oct. 24, 2019

Related U.S. Application Data

(63) Continuation of application No. 15/444,924, filed on Feb. 28, 2017, now Pat. No. 10,352,717.

(51) Int. Cl.
*G01C 21/36* (2006.01)
*G06F 9/54* (2006.01)
*G06F 3/0484* (2013.01)

(52) U.S. Cl.
CPC ..... *G01C 21/3667* (2013.01); *G01C 21/3635* (2013.01); *G06F 3/04847* (2013.01); *G06F 9/54* (2013.01); *G06F 9/541* (2013.01)

(58) Field of Classification Search
CPC ............ G01C 21/3667; G01C 21/3635; G06F 3/04847; G06F 9/54; G06F 9/541

(Continued)

(56) References Cited

U.S. PATENT DOCUMENTS 10,352,717 B2 * 7/2019 Scarr ................. G01C 21/3635
2017/0277578 A1   9/2017 Greenwood et al.

FOREIGN PATENT DOCUMENTS

EP    2546741    1/2013
JP    2014174143  9/2014

OTHER PUBLICATIONS

Anonymous, "Providing Directions", Mar. 21, 2016, https://www.developer.apple.com/library/content/documentation/UserExperience/Conceptual/LocationAwarenessPG/ProvidingDirection/uid/TP40009497-CH8-SW5, retrieved on Jan. 9, 2018, 8 pages.

(Continued)

*Primary Examiner* — Gertrude Arthur Jeanglaude
(74) *Attorney, Agent, or Firm* — Dority & Manning, P.A.

(57) ABSTRACT

Navigation application programming interfaces that can be used to obtain navigation information in third party software applications are provided. In one example implementation, an application programming interface (API) can include a first set of instructions associated with a navigator class. The navigator class can specify a plurality of functions to control the implementation of a navigation service by the software application. The navigation service can provide navigation information to a user of the software application. The API can include a second set of instructions associated with a navigator delegate protocol. The navigator delegate protocol can be a delegate of the navigator class. The navigator delegate protocol can implement one or more calls to update the navigation information provided as part of the navigation service.

20 Claims, 6 Drawing Sheets

(58) Field of Classification Search
USPC .......................................................... 701/428
See application file for complete search history.

(56) References Cited

OTHER PUBLICATIONS

International Search Report for PCT/US2017/055863 dated Jan. 18, 2018, 13 pages.
Written Opinion for Application No. PCT/US2017/055863 dated Feb. 4, 2019, 6 pages.
Lonkar, "What's New in Mapkit", Jun. 18, 2015, http://devstreaming.apple.com/videos/wwdc/2016/206v5ce46maax7s/206/206_whats_new_in_mapkit.pdf, retrieved on Jan. 9, 2018, 169 pages.
"Location and Maps Programming Guide", apple, "https://developer.apple.com/library/content/Documentation/UserExperience/Conceptual/LocationAwarenessPG/", pp. 1-31. date unknown.

* cited by examiner

NAVIGATION APPLICATION PROGRAMMING INTERFACE

The present disclosure is a continuation of U.S. application Ser. No. 15/444,924 having a filing date of Feb. 28, 2017. Applicant claims priority to and benefit of all such applications and incorporates all such applications herein by reference.

FIELD

Background

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include maps applications that make varied geographic information (e.g., current location information presented on a map) available to users.

Application programming interfaces can allow applications implemented on computing devices to interact with various services to provide information and functionality to a user. Application programming interfaces can provide a tool for developers to easily embed information, programming, services, frameworks, and structures into applications for access by the user.

SUMMARY

Aspects and advantages of embodiments of the present disclosure will be set forth in part in the following description, or may be learned from the description, or may be learned through practice of the embodiments.

One example aspect of the present disclosure is directed to a non-transitory computer-readable medium storing instructions that implement an application programming interface for obtaining navigation information for a software application executed on an iOS computing device implementing an iOS operating system. The computing device can have one or more processors and a display device. The application programming interface can include a first set of instructions associated with a navigator class. The navigator class can specify a plurality of functions to control the implementation of a navigation service by the software application. The navigation service can provide navigation information to a user of the software application. The API can include a second set of instructions associated with a navigator delegate protocol. The navigator delegate protocol can be a delegate of the navigator class. The navigator delegate protocol can implement one or more calls to update the navigation information provided as part of the navigation service.

Other example aspects of the present disclosure are directed to systems, apparatus, tangible, non-transitory computer-readable media, user interfaces, memory devices, and electronic devices associated with an application programming interface for providing navigation information.

These and other features, aspects and advantages of various embodiments will become better understood with reference to the following description and appended claims. The accompanying drawings, that are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, that makes reference to the appended figures, in that.

DETAILED DESCRIPTION

Figure 1:
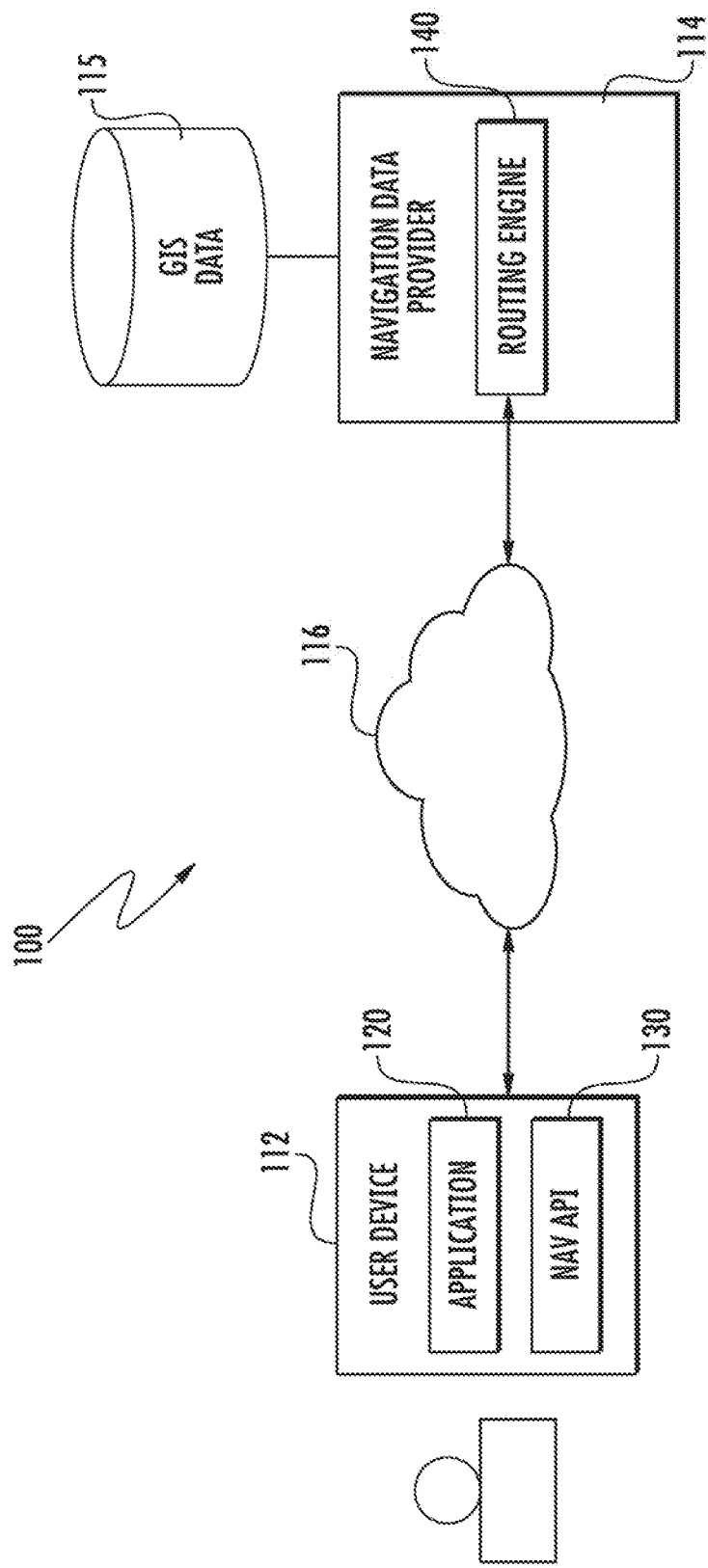
FIG. 1 depicts an overview of an example system for implementing a navigation service as part of a software application using an application programming interface according to example embodiments of the present disclosure.

Reference now will be made in detail to embodiments, one or more examples of that are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for providing navigation information in software applications implemented on one or more computing devices implemented on an iOS operating platform (e.g., using an iOS operating system). iOS operating platforms are mobile operating systems created for use on mobile devices. As used herein, an "iOS computing device" refers to a computing device that implements an iOS operating system.

In some embodiments, the navigation API can allow application developers to embed a navigation experience provided by a navigation data provider or other source in their software application. The API can allow the developer to easily customize and tailor the navigation experience to accommodate varying platforms and end use cases.

More specifically, the API, when invoked by a software application implemented on an iOS computing device, can be configured to request and receive routing information from a data provider (e.g., a remote data provider or a data provider stored locally on the iOS computing device). The API can be configured to present navigation information (e.g., through a graphical user interface component or through audio and/or vibratory cues) based on the routing information to provide a navigation service embedded in the software application.

A navigation service can be an application (e.g. a software application) that provides navigation information that can be used to guide a user from an origin and a destination. In some embodiments, the navigation service embedded in the software application can provide navigation information (e.g., turn-by-turn navigation information) to a user as a user traverses along a navigation route or other path. More particularly, in some embodiments, the navigation service can receive a route directing a user from to a current location to a destination. As one example, the route can include a sequence of steps, each describing a route portion (e.g., name or number of the road, distance, travel time, speed limit) and a maneuver (e.g., left turn, merge right, proceed straight) to access the next route portion. The navigation service can provide the route to a user through a graphical user interface and via one or more cues (e.g., audio or video cues) to guide the user from an origin to a destination.

In some embodiments, the software application can interact with a routing engine implemented by a navigation data provider or other source (e.g., a local source of navigation information) via the API to obtain routing information and other navigation information. The navigation data provider can be associated with a separate entity relative to the developer of the software application. For instance, the navigation data provider can be associated with a web server that hosts a geographic information system. The navigation information can include a route to one or more waypoints. The navigation information can further include map data for presentation in conjunction with the route and other information. The navigation information can be continuously updated (e.g., through one or more event listener interfaces implemented as part of the API) as the user traverses the navigation route to provide a real time or near real time navigation experience for a user.

The API when implemented by a software application can visually present the navigation information associated with the navigation service in a graphical user interface component displayed in conjunction with the software application. For instance, the graphical user interface component can display a map. During a navigation mode, the graphical user interface component can display a route in polyline on the map. The position of the user can be updated along the route as the user navigates the route. For instance, the navigation service can provide a graphical user interface where a position of the user is continuously updated along the navigation route as the user position changes along the navigation route. Various waypoints can be identified by markers located in the map. Other information can be presented in the graphical user interface component, such as estimated time or distance remaining to arrival at a waypoint ("ETD information"), a compass interface element, a navigation heading element, etc. In some embodiments, the navigation information can be provided using audio guidance with or without the visual display of navigation information in the graphical user interface component.

According to particular aspects of the present disclosure, the API can include sets of computer-readable instructions that when executed by one or more processors facilitate integration of the navigation experience into a developer's software application. The sets of instructions, when implemented by one or more processors, can govern interaction by the software application with the navigation data provider via the API as well as the display and/or delivery of navigation information to the user as part of the software application.

More particularly, example instructions associated with an API that are facing a developer of a software application can include a set of instructions specifying one or more parameters that govern the display of the visual output of the navigation service. The API can further include a set of instructions specifying one or more parameters that control the implementation of the navigation service and a set of instructions that governs the interaction of the API with the routing engine provided by the navigation data provider.

According to particular aspects of the present disclosure, the navigation API can include a developer facing API that includes a plurality of main classes and protocols. The classes can include a navigation services class that can include utility methods for providing terms and conditions and/or license information associated with the API. The classes can include a navigator class. The navigator class can be a singleton that provides methods to control navigation programmatically. The methods can include, for instance, one or more of a display of routes, navigation start, navigation stop, and camera angle change. In some embodiments, the API can include a UI settings class that can be used by a developer to specify settings related to UI elements.

In some embodiments, the API can include a navigator delegate protocol. The navigator delegate protocol can be specified as a delegate of the navigator class. The navigator delegate protocol can specify navigation related callbacks (e.g., location updates, remaining time and/or remaining distance updates, etc.).

In some embodiments, the navigation API can further use or share functionality with a maps application programming interface. The maps application programming interface can include a map view class to provide camera following methods. In some embodiments, the camera following methods can be used with or without a navigator class being instantiated.

In some embodiments, the relationship between the navigator class and the map view class can be specified to such that the navigation API can reuse or implement one or more aspects of the functionality of a map view class specified as part of a separate maps API. In some embodiments, the navigator class can take control of an instance of an existing maps view class to display routes and navigation user interface elements in conjunction with a map. In some embodiments, the maps view class can be wrapped into the navigator class.

Aspects of the present disclosure can provide a number of technical effects and benefits. For instance, the APIs can facilitate the integration of a navigation service into a developer's software application. The use of delegate protocols for callbacks to obtain navigation information (e.g., location updates, remaining time and/or remaining distance updates, etc.) can facilitate implementation in iOS operating platform environments. The relationship between the navigator class and the map view class so that navigation API shares functionality with existing maps APIs that provide functionality, such as drawing a map, showing traffic information, setting manual camera angles, adding markers, etc. The APIs can allow for the customization of the navigation service for various end use needs, such as for ride sharing applications, shipping/delivery applications, social applications, and other end use applications.

Aspects of the present disclosure refer to class, function, property, and protocol names (e.g., navigator class, navigator delegate protocol, UI settings class, update location function, arrive at waypoint function, change route function, arrive at waypoint function, update remaining time function, set destinations function, map view class, navigation waypoint class, navigation map class, etc.). Those of ordinary skill in the art, using the disclosures provided herein, will understand that the class names are provided for identification purposes only and are not intended to limit the scope of the present disclosure. For instance, a navigator class can be any class, regardless of name, that includes one or more aspects of the navigator class described herein.

FIG. 1 depicts an overview of an example system 100 for implementing a navigation service as part of a software application using a navigation API according to example embodiments of the present disclosure. The system 100 can include a user device 112 that can receive navigation data from a navigation data provider 114 via a communication network 116. The user device 112 can be, for instance, a smartphone, tablet, wearable device, laptop, desktop, mobile device, device capable of being carried by a user while in operation, display with one or more processors, vehicle system, or other user device 112.

A software application can be implemented on the user device 112. The software application can be, for instance, a mapping application, a browser, a ride share application, an application used to assist with delivery, a social media application or other software application that may need to provide navigation information to a user. The software application 120 can be stored locally on the user device 112 or can be, for instance, a web application accessed via a browser implemented on the user device 112. In some embodiments, the software application 120 can be developed by a third party entity that is independent of and/or not affiliated with an entity associated with the navigation data provider 114.

The software application 120 can invoke a navigation API 130 to access and provide navigation data from the navigation data provider 114 via the communication network 116 so that a navigation service can be embedded in the software application 120. Example aspects of the present disclosure are discussed with accessing data from a remote navigation data provider 114 for purposes of illustration and discussion. Those of ordinary skill in the art, using the disclosures provided herein, will understand that the API 130 can access data from other sources, such as local sources or applications located on the user device 112.

The navigation service can present navigation information (e.g., turn-by-turn navigation information) to a user in real time or near real time as a user or vehicle carrying the user device 112 traverses along a route from an origin to one or more destinations. The navigation service can include a graphical user interface component for presenting the navigation information to the user on one or more display devices. In addition and/or the navigation service can provide audio guidance or other notifications (e.g., vibratory notifications) to the user indicative of navigation information (e.g., turn-by-turn) directions).

Referring back to FIG. 1, the API 130 can be configured to interface with a routing engine 140 implemented by the navigation data provider 114. The routing engine 140 can be configured to, for instance, compute routes to one or more waypoints, access mapping data, update navigation data based on various navigation events, and respond to requests for navigation data from the API 130. In some embodiments, the navigation data provider 114 can include one or more servers, such as web servers. The one or more servers can include one or more processors and one or more memory devices. The one or more memory devices can store computer-readable instructions to implement, for instance, the routing engine 140. In some embodiments, the routing engine 140 can access data associated, for instance, with a geographic information system 115. The geographic information system 115 can include data that is indexed by geographic coordinates of its elements. The data associated with the geographic information system 115 can include, for instance, map data, route data, geographic imagery, data associated with various waypoints (e.g., business listing names, addresses, geographic coordinates, etc.) and other data.

The application 120 can implement a navigation service by interacting with the navigation data provider 114 via the API 130 over the network 116. The network 116 can be any type of communications network, such as a local area network (e.g. intranet), wide area network (e.g. Internet), cellular network, or some combination thereof. The network 116 can also include a direct connection. In general, communication can be carried via network 116 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 2:
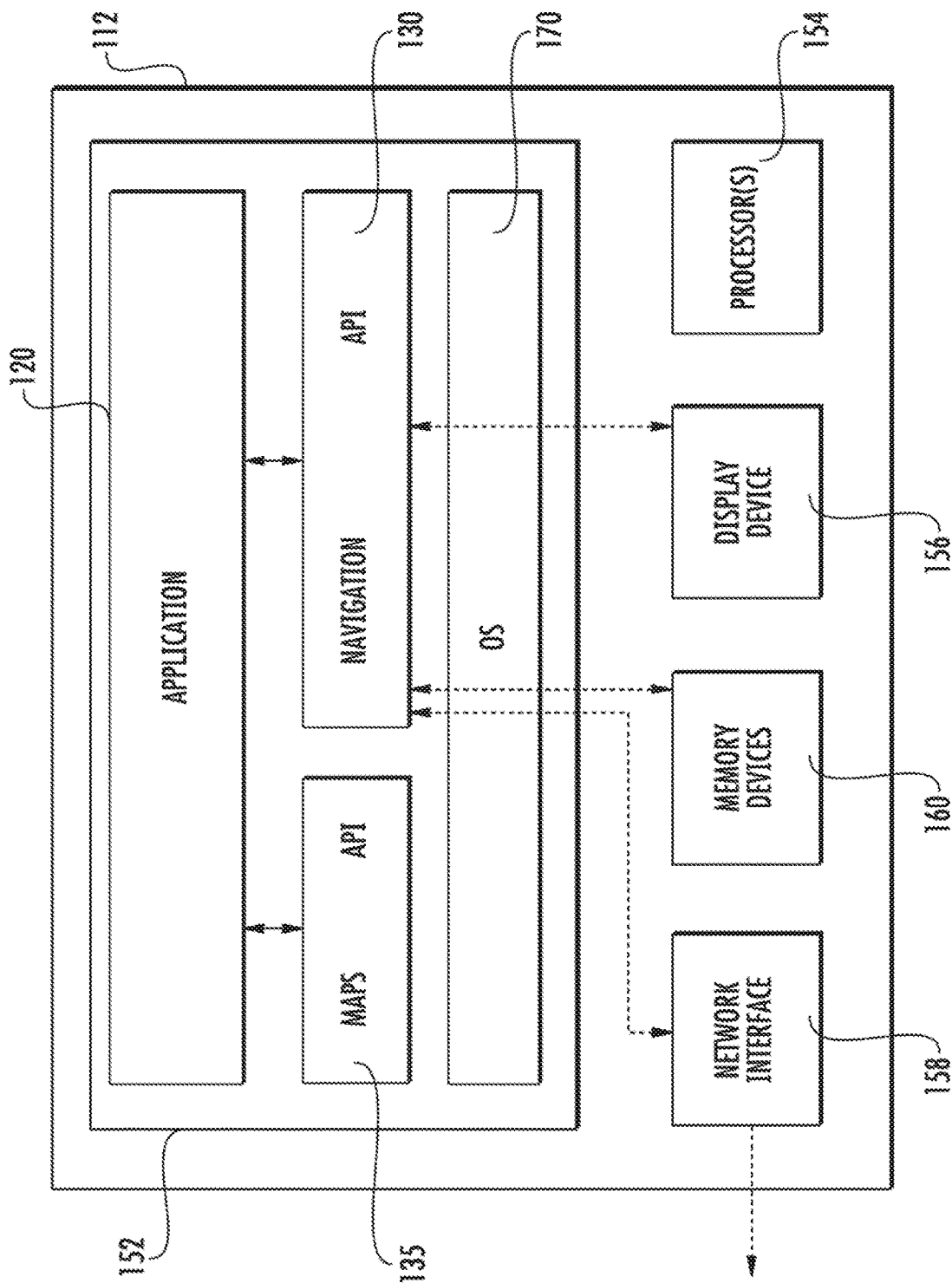
FIG. 2 depicts a block diagram of an example user device implementing a software application according to example embodiments of the present disclosure.

FIG. 2 depicts an example user device 112 configured to implement a navigation API 130 according to example embodiments of the present disclosure. As shown, the user device 112 includes an instruction memory 152, one or more processors 54 configured to execute instructions stored in the memory 152, a display device 156, a network interface 158 that supports network communications, and a storage memory 160. For clarity, the instruction memory 152 and the storage memory 160 are illustrated separately. It will be understood, however, that the components 152 and 160 also can be regions within the same memory module. More generally, the user device 112 can include one or several additional processors, memory devices, network interfaces, that may be provided separately or on a same chip or board. Further, the components 152 and 160 may include persistent memory (e.g., flash memory), volatile memory (e.g., RAM), or both, or other suitable memory.

The instruction memory 52 can store sets of instructions of an operating system (OS) 170, a navigation API 130, and a software application 120. The OS 170 can be a mobile OS developed specifically for mobile devices. As such, the OS 170 can include functions that allow the software application to access data such as wireless network parameters (e.g., identity of the wireless network, quality of service), as well as invoke such services as telephony, location determination (e.g., via global positioning service (GPS) or WLAN), wireless network data call origination, etc. In some example implementations, the OS includes or is based upon an iOS mobile operating system or similar operating system.

The software application 120 can be, for example, a mapping application, a navigation application, ride share application, an application to assist with delivery, a social media application, etc. Further, the software application 120 can be a web browser application that invokes the navigation API 130 to display navigation information within an allocated portion of a browser window. In general, the navigation API 130 can be made available to any suitable software application that executes on the user device 120. Also, multiple different software applications may invoke the navigation API 130.

As discussed above, the software application 120 can invoke the navigation API 130 to embed a navigation service in the software application 120. For instance, in one example, a software application 120 can provide one or more waypoints to the navigation API 130. The navigation API 130 can request navigation data from a navigation data provider (e.g., local or remote) to determine a navigation route based on the one or more waypoints. The navigation API 130 can include sets of instructions to control the presentation of navigation information to the user as part of the navigation service. In some embodiments, the navigation API 130 can use or share functions with a maps API 135. For instance, a maps view class provided as part of a maps API 135 can be used in a variety of ways in conjunction with the navigation API 130 to provide maps functionality and navigation functionality to a user of the software application 120.

In some embodiments, the user device can include a positioning system. The positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLO-NASS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position.

The navigation API 130 and/or the maps API 135 can be implemented as one or several functions, a data structure, etc. Further, the navigation API 130 and/or the Maps API may include compiled code that executes directly on the processor(s) 154 or, alternatively, instructions in any other form such as a scripting language interpreted at runtime by the application 120. The instructions can, in some embodiments, be implemented at least in part using a programming languages, such as Swift or Objective C. The navigation API 130 and/or the maps API 135 in one example implementation includes well-documented prototypes of several functions that a developer can include in the code of the software application 120, as well as instructions that implement these functions. In some embodiments, the navigation API 130 and/or the maps API 134 can be provided to the developer as a static library.

Figure 3:
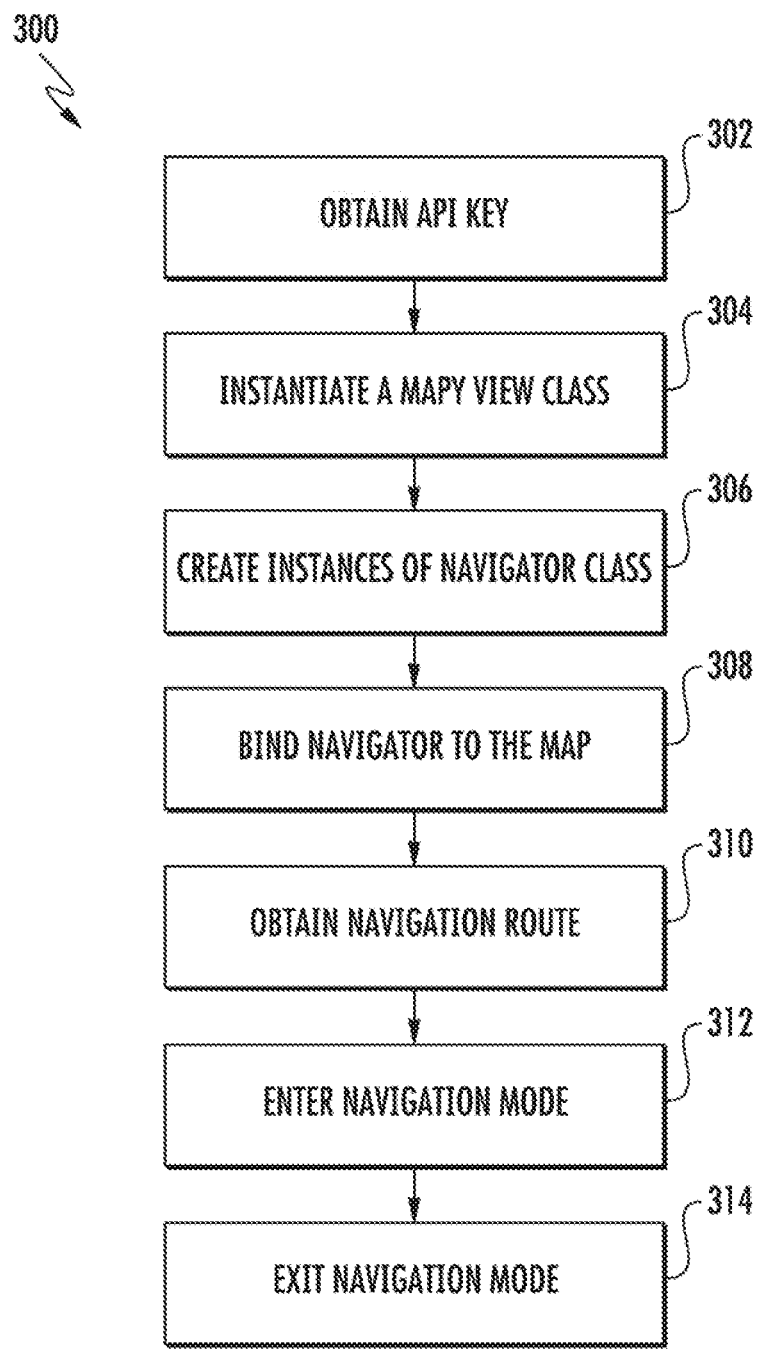
FIG. 3 depicts a flow diagram of an example method according to example embodiments of the present disclosure.

The navigation API 130 is illustrated as separate from the maps API 135 in FIG. 3. However, in some embodiments, the navigation API 130 can be included as part of the functionality of the overall maps API 135. In some embodiments, the maps API 135 can be included as part of the functionality of the navigation API 130.

FIG. 3 depicts a flow diagram of an example method (300) of integrating a navigation service as part of a software application using a navigation API according to example embodiments of the present disclosure. FIG. 3 depicts steps performed in a particular order for purposes of illustration and discussion. Those of ordinary skill in the art, using the disclosures provided herein, will understand that various steps of any of the methods provided herein can be adapted, expanded, omitted, performed simultaneously, and/or modified in various ways without deviating from the scope of the present disclosure.

At (502), the method can include providing an API key to a services class on launch of the software application. The services class can be a service class for a maps API. The services class can includes a shared services function to share an instance of the service class with the maps API. The services class can include a provide API key function that can provide the API key to a provider of the maps API and the navigation API. The service class can further include a license function configured to return license information. The service class can include a version function configured to return a version for the release of the maps API.

At (504), the method can include instantiating a maps view class in a view controller and adding it to a view hierarchy. This can result in the display of a map, to which markers and polylines can be added.

At (506), navigator instances of a navigator class associated with navigation API can be created. Details concerning the navigator class will be provided below. The navigator can then be bound to the map (508) so that the routes and turn-by-turn directions are found displayed.

The navigation service can then be implemented using the navigation API. For instance, a navigation route can be obtained from, for instance a routing engine (510). The route can be displayed on the map once it has been fetched. A navigation mode can be entered at (512) where camera change and turn-by-turn directions are displayed as a user traverses along the route. Navigation can continue until a destination is reached or the navigation mode is exited (514).

An example implementation of the above method is provided as follows:

```
/*
    MyAppDelegate.mm
*/
- ( BOOL ) application :( UIApplication *) application
        didFinishLaunchingWithOptions :( NSDictionary *) launchOptions {
    [ GMSServices provideAPIKey : kAPIKey ];
}
/*
    MyAppNavigationViewController.mm
*/
@interface MyAppNavigationViewController ( )<
        GMSNavigatorDelegate,
        GMSUIControllerNavigationDelegate >
@end
@implementation MyNavigationViewController {
    GMSMapView *_mapView;
    GMSNavigator *_navigator;
}
- (void) loadView {
    // Construct a map
    _mapView = [GMSMapView mapWithFrame : CGRectZero];
    _mapView.delegate = self;
    self.view = _mapView;
    // Request the navigator with a callback. Terms and conditions will be displayed.
```

```
    __weak typeof (self) *weakSelf = self;
    [GMSNavigationServices showTermsAndConditionsDialog :^(BOOL result) {
        typeof (self) *strongSelf = weakSelf;
        if (result && strongSelf) {
            [self fetchNavigator]
        } else {
            // Terms were rejected. Exit the view.
        }
    }];
}
/*
    Fetches the shared navigator instance and configures the navigation map and UI.
 */
- (void) fetchNavigator {
    // Request the navigator.
    _navigator = [[Navigator alloc] init];
    _navigator.delegate = strongSelf;
    // Configure UI settings
    GMSUISettings *settings = _mapView.settings;
    settings.navigation Header = NO;
    settings.trafficIncidentCards = NO;
    settings.delegate = self;
    // Take control of the map
    _mapView.navigator = _navigator;
}
/*
    Shows the route to the destination when a new job is received.
 */
- (void) newJobIsAvailableToCoordinate :(CLLocationCoordinate2D) coordinate) {
    GMSNavigationWaypoint *destination =
        [[GMSNavigationWaypoint alloc] initWithCoordinate : coordinate];
    [ _navigator setDestinationsWithWaypoints : @[destination]
                    options: [GMSRoutingOptions defaultOptions]
                    callback : ^(RouteStatus routeStatus) {
        if (routeStatus == kRouteStatusOk) {
            _mapView.cameraMode = kGMSNavigationCameraModeRouteOverview;
        }
    }];
}
/*
    Enters navigation mode.
 */
- (void) acceptJobButtonWasPressed {
    _navigator.guidanceEnabled = YES;
    _mapView.cameraMode = kGMSNavigationCameraModeFollowing;
}
@end
```

Figure 4:
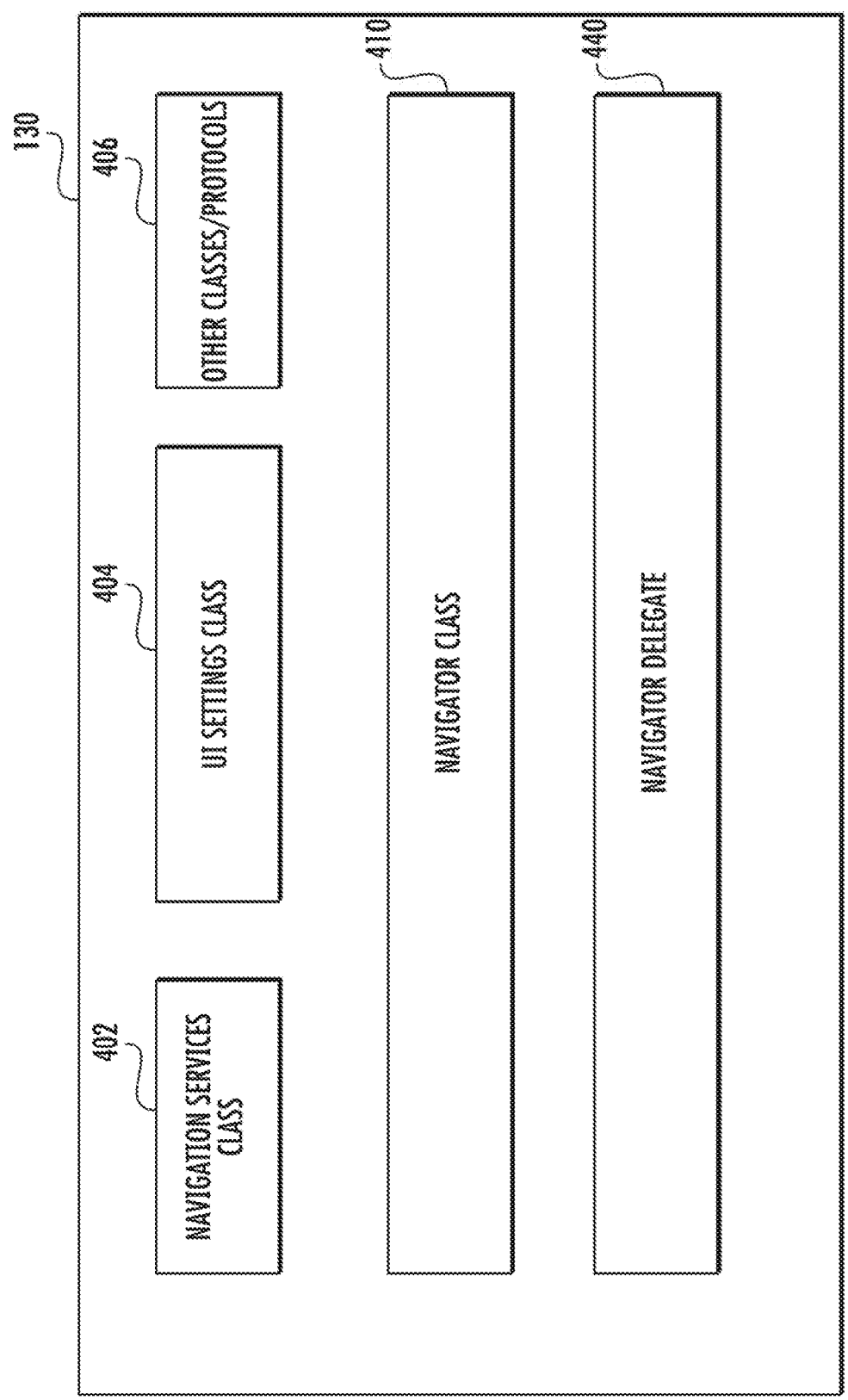
FIG. 4 depicts an example navigation application programming interface according to example embodiments of the present disclosure.

FIG. 4 depicts a block diagram of example sets of instructions associated with a navigation API 130 according to example embodiments of the present disclosure. As shown, the navigation API 130 can include a navigation services class 402, a UI settings class 404, a navigator class 410, and a navigator delegate 440. The API 130 can include other classes/protocols 406. Details concerning the navigation services class 402, UI settings class 404, navigator class 410, and navigator delegate 440 and other classes/protocols that can be used in example implementations are provided below.

The navigation services class 402 can expose general methods for the navigation API 130. The navigation services class 402 can a service class for the navigation API 130. The navigation services class 402 can include static public member functions including a terms and conditions accepted function that returns whether the user has accepted the terms and conditions, a show terms and conditions if needed function that shows the terms and conditions if the user has not yet accepted, and a license info function that returns the software license information for the navigation API. An example implementation of a navigation services class 402 is provided below:

```
/**
 * Called when the user accepts or rejects the terms and conditions.
 */
typedef void (^GMSTermsResponseCallback)(BOOL result);
/**
 * Provides utility methods for the Navigation SDK.
 */
@interface GMSNavigationServices : NSObject
/**
 * Prompts the user with a dialog containing the terms and conditions for use of
 * the Navigation SDK.
 */
```

```
+ (void) showTermsAndConditionsDialogOnViewController :(UIViewController*)controller
callback :(GMSTermsResponseCallback) callback;
/**
 * Checks if the terms and conditions have been accepted by the user.
 */
+ (BOOL) termsHaveBeenAccepted ;
/**
 * Returns the open source software license information for Google Maps SDK for
 * iOS. This information must be made available within your application.
 */
+ (NSString *) openSourceLicenseInfo ;
/**
 * Returns the version for this release of the Google Navigation SDK for iOS.
 */
+ (NSString *) SDKVersion;
@end
```

The navigator class 410 can be a controller of navigation functionality, allowing routes to be displayed in conjunction with a map, navigation to start and stop, camera angle change, etc. In some embodiments, the navigator class 410 can control an instance of a map view class on that routes and turn-by-turn directions are displayed. In some embodiments, the navigator class 410 can be used to provide navigation updates (e.g., location, ETA) without any map being visible in a user interface. The navigator class 410 can be a singleton. In some embodiments, the navigator class 410 does not support subclasses. All methods can be required to be called from the main thread.

Figure 5:
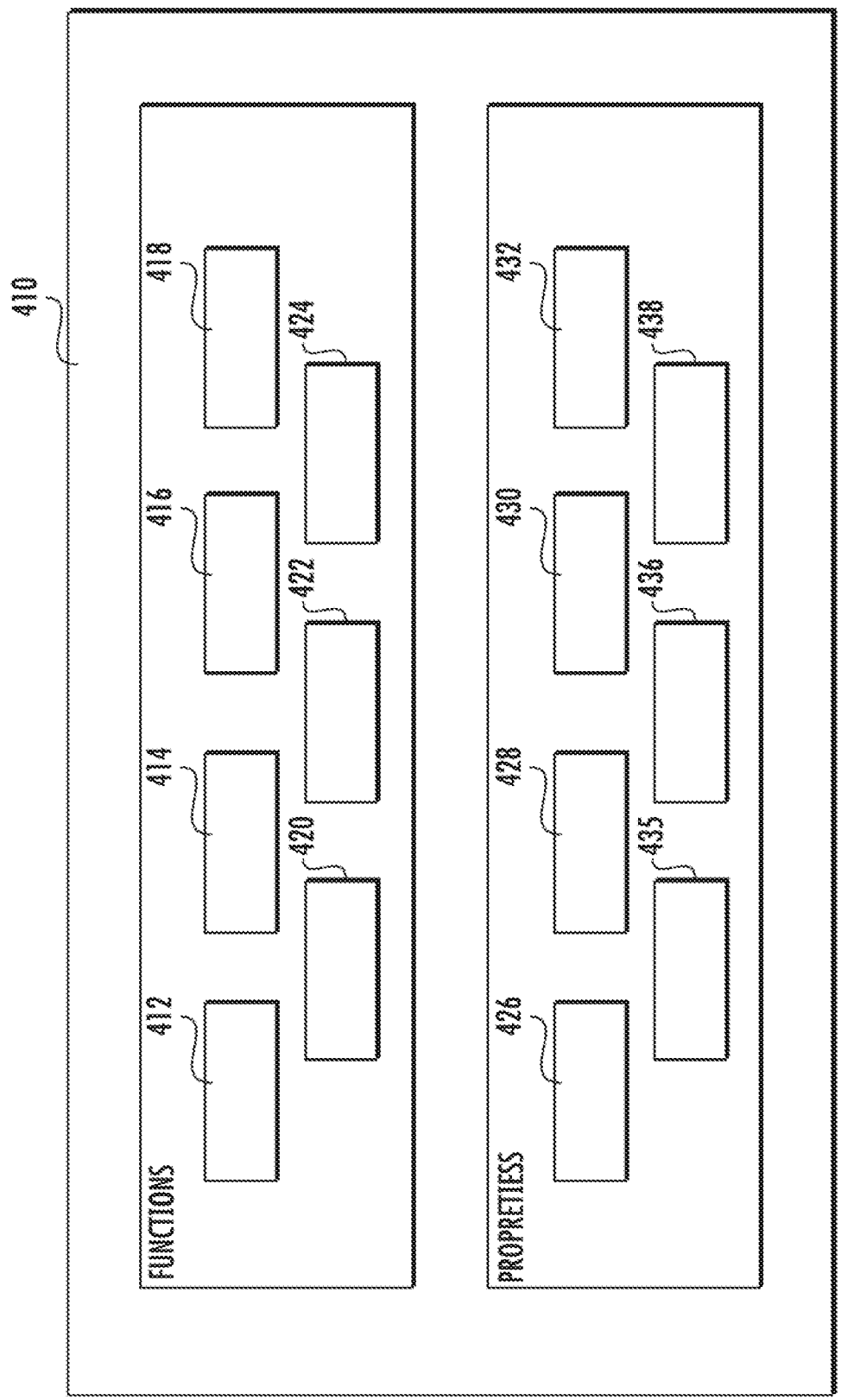
FIG. 5 depicts an example first set of instructions associated with a navigator class according to example embodiments of the present disclosure.
Figure 6:
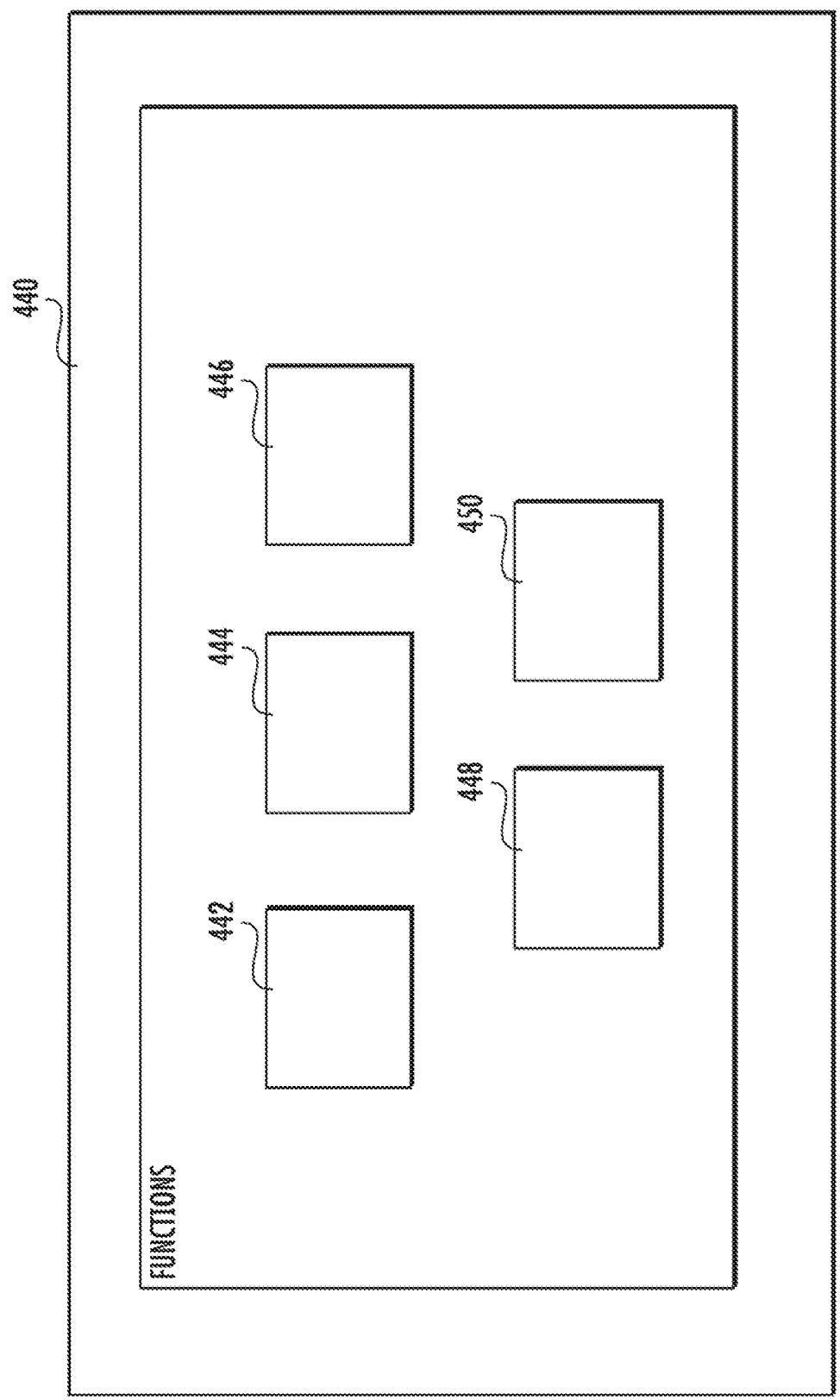
FIG. 6 depicts an example set second set of instructions associated with a navigator delegate protocol according to example aspects of the present disclosure.

FIG. 5 depicts an example navigator class 410 according to example embodiments of the present disclosure. The navigator class 410 can include a plurality of functions. For instance, the navigator class 410 can include a set destinations callback function 412 that can set multiple destinations for navigation and can override any previously set destinations. The callback can be called with an ok status when a route is found to the one or more destinations.

The navigator class 410 can include a continue to next destination function 414 that can pop the first destination from the current list of destinations. The navigator class 410 can include a clear destinations function 416 that can clear all previously set destinations and remove any calculated routes from the map. The navigator class 410 can include a time to waypoint function 418 that can return the estimated time to the given waypoint or a maximum if the waypoint is not a part of the current route. The navigator class 410 can include a distance to waypoint function 420 that can return the estimated distance to the given waypoint or a maximum if the waypoint is not a part of the current route. The navigator class 410 can include a simulate locations along existing route function 422 that can simulate travel along the route currently set on the navigator class 410. The navigator class 410 can include a stop simulation function 424 that can end the simulation if a simulation is active.

In some embodiments, the navigator class 410 can include a plurality of properties. Some properties can be updated by a navigator delegate protocol. The properties can include a guidance active property 426 that can provide whether turn-by-turn guidance is currently enabled; a time to next destination property 428 that can provide the estimated time to the next destination; a distance to next destination property 430 that can provide the estimated distance to the next destination; a current route leg property 432 that can provide the current leg of the journey; a route legs property 434 that can provide an array of route legs wherein each leg corresponds to a destination that was set; a voice guidance property 436 that can provide whether voice guidance should be enabled for traffic and turn-by-turn alerts; and a vibration enabled property 438 that can determine whether the device should also vibrate when voice alerts are played.

An example interface of a navigator class 410 is provided below:

```
/**
 * A GMSRouteStatus is a status code that represents the result of a route
 * request.
 */
typedef NS_ENUM (NSInteger, GMSRouteStatus) {
    /** A route to the destination was successfully calculated. */
    GMSRouteStatusOk = 1,
    /** A route to the destination could not be calculated. */
    GMSRouteStatusNoRouteFound = 2,
    /** A route to the destination could not be calculated because of a network
        error. */
    GMSRouteStatusNetworkError = 3,
    /** A route to the destination could not be calculated because of insufficient
        quota. */
    GMSRouteStatusQuotaCheckFailed = 4,
    /** A route could not be calculated because the provided key does not have
        permission to use Navigation SDK. */
    GMSRouteStatusAPIKeyNotAuthorized = 5,
    /** A route could not be calculated because the Navigation SDK terms and
        conditions have not been accepted by the user. */
    GMSRouteStatusTermsAndConditionsNotAccepted = 6,
    /** The route calculation was cancelled in favor of a newer one. */
    GMSRouteStatusCancelled = 7,
```

-continued

```
    /** A route could not be calculated because GPS location was turned off by the
        user. */
    GMSRouteStatusLocationDisabled = 8,
};
/**
 * Called when a route from the user's location to the provided destination(s) is
 * found, or fails to be found for a reason indicated by the RouteStatus.
 */
typedef void (^GMSRouteStatusCallback)(GMSRouteStatus routeStatus);
/**
 * Allows a navigation sessions to be initiated, controlled and monitored by
 * finding a route to destinations, entering navigation mode and providing
 * information such as the distance remaining and ETA. The navigator can control a
 * GMSMapView on that routes and turn-by-turn directions will be displayed.
 *
 * This class is a singleton and the shared instance should be obtained using the
 * [Navigator sharedNavigator] method.
 */
@interface GMSNavigator : NSObject
/**
 * Provides the shared GMSNavigator instance, creating it if necessary. This
 * method should only be called after:
 * - An API key has already been provided using [GMSServices provideAPIKey:<key>]
 * - The Navigation SDK terms and conditions have been displayed and accepted
 *
 * This method will throw an exception if either of these conditions are not met.
 */
+ (instancetype) sharedNavigator;
+ (instancetype)init;
/**
 * Sets the delegate that can receive callbacks from the Navigator due to
 * changes in navigation state, e.g. location updates, changes in remaining
 * time or distance, or changes in the planned route.
 */
@property(nonatomic, weak) id<GMSNavigatorDelegate> GMS_NULLABLE_PTR
delegate;
/**
 * Provides access to the GMSNavigationUISettings for this navigator that contains
 * methods to configure the appearance of UI elements such as the navigation
 * header, footer and compass.
 */
@property (nonatomic, readonly) GMSNavigationUISettings *navigationUISettings;
/**
 * Sets the threshold for how much the remaining journey time must change before
 * the didUpdateRemainingTimeOrDistance delegate method is called.
 */
@property (nonatomic) NSTimeInterval timeChangedThreshold;
/**
 * Sets the threshold for how much the remaining journey distance must change
 * before the didUpdateRemainingTimeOrDistance delegate method is called.
 */
@property (nonatomic) CLLocationDi stance distanceChangedThreshold;
/**
 * Sets that types of audio guidance (including vibration) are enabled. By
 * default, vibration, voice, and voice over Bluetooth (if available) are
 * enabled.
 */
@property (nonatomic) GMSAudioGuidance audioGuidance;
/**
 * Returns the route travelled so far during this guidance session (since the
 * last call to startGuidance). The route recorded consists of the road-snapped
 * locations as are provided to the GMSNavigatorDelegate, and simplified to
 * remove redundant points, for example turning consecutive colinear points into
 * a single line segment.
 */
@property (nonatomic, readonly, copy) GMSPath *GMS_NULLABLE_PTR travelledRoute;
/**
 * The current leg of the journey. This RouteSegment will have its starting
 * position as the most recent known (road-snapped) position of the device.
 */
@property (nonatomic, readonly, copy)
    GMSRouteSegment *GMS_NULLABLE_PTR currentRouteSegment;
/**
 * An array of route segments where each segment corresponds to a destination
 * set by setDestinationsWithWaypoints:options:callback.
 */
@property (nonatomic, readonly, copy)
    GMS_NSArrayOf (GMSRouteSegment *) *GMS_NULLABLE_PTR routeSegments;
/**
```

-continued

```
 * The estimated time and distance from the current position to the current
 * destination.
 */
@property (nonatomic, readonly, copy) GMSTimeAndDistance *GMS_NULLABLE_PTR
    timeAndDistanceToNextDestination;
/**
 * An array of times and distances corresponding to each destination in the
 * current route, representing the estimated time and distance from the current
 * position to each destination.
 */
@property (nonatomic, readonly, copy)
    GMS_NSArrayOf (GMSTimeAndDistance *) *GMS_NULLABLE_PTR
    timesAndDistances;
/**
 * Sets the navigator to control the provided map and stop controlling the previous
 * map if there was one. This causes the camera to immediately begin to follow the
 * user's location. Some of the map attributes will be overridden whilst the
 * navigator is in control, eg the map type will be temporarily changed to normal
 * despite the current value of the mapType property.
 *
 * If navigation is already in progress, the current route will be immediately
 * displayed along with turn-by-turn directions.
 */
- (void) startControllingMap : (GMSMapView *) mapView;
/**
 * Stops the GMSNavigator from controlling the current GMSMapView, if one is
 * currently set. This does not stop navigation. Alerts will continue to be
 * generated, and route information, eg distance remaining will continue to be
 * calculated.
 *
 * This causes any map attributes that were overridden during navigation to again
 * respect the current property values. Eg, if mapType is set to GMSTypeHybrid,
 * then the map will now return to displaying in hybrid mode.
 */
- (void) stopControllingMap;
/**
 * Sets multiple destinations for navigation, overriding any previously set
 * destinations.
 *
 * The provided callback will be called with GMSRouteStatusOk if a route is found
 * from the user's location to the given destination. If a new destination is set
 * before a route is found, then the request will be cancelled, and the callback
 * will be called with GMSRouteStatusCancelled. If a route cannot be found for any
 * other reason, the callback will be called with an appropriate error status.
 */
- (void)
    setDestinationsWithWaypoints : (GMS_NSArrayOf (GMSNavigationWaypoint *) *)
    waypoints
                      options : (GMSRoutingOptions *) options
                     callback : (GMSRouteStatusCallback) callback;
/**
 * Removes the current destination. Following this call, guidance will be toward
 * the next destination, and information about the old destination is not
 * available.
 *
 * @return the waypoint guidance is now heading to, or nil if there were no
 * more waypoints left
 */
- (GMSNavWaypoint *GMS_NULLABLE_PTR) continueToNextDestination;
/**
 * Clears all previously set destinations and removes any calculated routes from
 * the map. If navigation is running, this will automatically stop it.
 */
- (void) clearDestinations;
/**
 * If a destination has been set and a route computed for it, starts
 * turn-by-turn navigation guidance for the route. If a route has not yet been
 * computed, turn-by-turn guidance will start once it has.
 */
- (void) startGuidance;
/**
 * Stops turn-by-turn navigation guidance.
 */
- (void) stopGuidance;
/**
 * Sets the camera to follow the location of the user. This is typically called
 * when starting turn-by-turn guidance to enter a "tilted" driving view. It can
```

```
  * also be used to re-enable camera following after calls to showRouteOverview, or
  * the manual camera setter methods of GMSMapView.
  */
- (void) followMyLocationWithPerspective : (GMSNavigationCameraPerspective)
perspective;
/**
  * Pans and zooms the map to show an overview of the remaining route. This will
  * temporarily prevent the camera from following the user's position.
  *
  * Camera following can be reenabled using followMyLocationWithPerspective.
  */
- (void) showRouteOverview;
@end
```

Referring to FIG. 4, the navigator delegate protocol 440 can be a delegate of the navigator class 410. The navigator delegate 440 can include a plurality of functions. For instance, the navigator delegate can include an update location function 442 that can be called when the user's location is updated. The navigator delegate 440 can include an arrive at waypoint function 444 that can be called when a user has arrived at a navigation waypoint. The navigator delegate 440 can include a change route function 446 that can be called when the current route is changed or cleared. The navigator delegate 440 can include an update remaining time function 448 that can be called when the estimated time(s) to the destination(s) are updated. The navigator delegate 440 can include an update remaining distance function 450 that can be called when the estimated distance(s) to the destination(s) are updated. The navigator delegate 440 can access or specify a navigator time update threshold parameter that specifies a minimum change in estimated time to the next destination that will trigger the update remaining time function 448 to be called. The navigator delegate 440 can access or specify a navigator distance update threshold parameter that specifies a minimum change in estimated distance to the next destination that will trigger the update remaining distance function 450 to be called.

An example implementation of a navigator delegate 440 is below:

Referring to FIG. 4, the UI settings class 404 can be used to specify UI settings associated with the navigation API 130. The UI settings class 404 can include a set all gestures enabled function that sets the preference for whether all gestures should be enabled or disabled. The UI settings class can include the following properties: a scroll gestures property that controls whether scrolls gestures are enabled or disabled; a zoom gestures property that controls whether zoom gestures are enabled or disabled; a tilt gestures property that controls whether tilt gestures are enabled or disabled; a rotate gestures property that controls whether rotate gestures are enabled or disabled; a consumes gestures in view property that controls whether gestures by users are completely consumed by the map view class when gestures are enabled; a compass button property that enables or disables the compass; a location button property that enables or disables the location button; an indoor picker property that enables or disables the indoor floor picker; an allow scroll gestures during rotate or zoom property that controls whether rotate and zoom gestures can be performed off-center and scrolled around.

An example implementation of a UI settings class is provided below:

```
@protocol GMSNavigatorDelegate <NSObject>
/**
  * Called when the driver's road-snapped location/heading is updated.
  * This is provided as frequently as possible by the navigation engine.
  */
- (void) navigator :(GMSNavigator *) navigator
    didUpdateLocation :(CLLocation *) location;
/**
  * Called when the driver has arrived at a GMSNavigationWaypoint.
  */
- (void) navigator :(GMSNavigator *) navigator
    didArriveAtWaypoint :(GMSNavigationWaypoint *) waypoint;
/**
  * Called when the route changes. The new route is available through the
  * GMSNavigator route segment properties.
  */
- (void) navigatorDidChangeRoute :(GMSNavigator *) navigator;
/**
  * Called when the time or distance to the next destination has changed
  * by more than the thresholds specified by the timeChangedThresholdSeconds
  * and distanceChangedThresholdMeters properties of GMSNavigator.
  */
- (void) navigator :(GMSNavigator *) navigator
    didUpdateRemainingTimeOrDistance : (GMSTimeAndDistance *) timeAndDistance;
@end
```

```
/**
 * A controller that allows different options for the navigation UI to be set.
 */
@interface GMSNavigationUISettings : NSObject
/**
 * Sets the delegate that can receive callbacks from the GMSNavigationUISettings
 * instance for UI-related events.
 */
@property (nonatomic, weak) id<GMSNavigationUISettingsDelegate>
GMS_NULLABLE_PTR delegate;
/**
 * Determines whether the turn-by-turn navigation header is visible during
 * navigation.
 */
@property (nonatomic) BOOL header;
/**
 * Determines whether the ETA card is visible during navigation.
 */
@property (nonatomic) BOOL etaCard;
/**
 * Determines whether traffic incident cards should be shown when the user
 * clicks on a traffic incident icon.
 */
@property (nonatomic) BOOL trafficIncidentCards;
/**
 * Determines whether traffic prompts should be shown. Traffic prompts
 * periodically appear to update the user on traffic conditions during
 * navigation.
 */
@property (nonatomic) BOOL trafficPrompts;
@end
```

In some embodiments, the navigation API 130 can include a UI settings delegate that includes a did not change night mode callback. An example implementation of the UI settings delegate is provided below:

```
/**
 * Represents the different modes that the Navigation UI elements can be in, eg the
 * map appearance, header and footer and buttons.
 */
typedef NS_ENUM (NSInteger, GMSNavigationUIMode) {
    /** The navigation UI is in the normal, day mode. */
    GMSNavigationUINormal = 1,
    /** The navigation UI is in night mode that has darker UI styling. */
    GMSNavigationUINight = 2,
};
/**
 * Delegate for navigation UI events.
 */
@protocol GMSNavigationUISettingsDelegate<NSObject>
@optional
/**
 * Called when the navigation UI enters or exits night mode.
 */
- (void) navigationUISettings :(GMSNavigationUISettings *) navigationUISettings
    didChangeUIMode :(GMSNavigationUIMode) mode;
@end
```

Referring to FIG. 4, the navigation API 130 can include other classes and protocols 406. Certain classes (e.g., classes associated with a maps API) can be controlled by, invoked by, or wrapped into aspects of the navigation API 130. The following is a list of classes and protocols that can be used in conjunction with an example implementation of an API with maps and navigation functionality according to example embodiments of the present disclosure.

Address Class: The address class can be a result from a reverse geocode request containing a human readable address. The address class can be immutable and can be obtained via a geocoder class. Fields may be nil in the address class. The address class can include public member functions, including an address line 1 function that returns the first line of the address and an address line 2 function that returns the second line of the address. The address class can include the following properties: a coordinate property that provides location; a thoroughfare property that provides street number and name; a locality property that provides locality or city; a sublocality property that provides a subdivision of locality, district or park.

CALayer Class: The CALayer class can be a superclass used by layers in the API. The CALayer class can be inherited by the map layer class and the panorama layer class.

Camera Position Class: The camera position class can be an immutable class that aggregates all camera position parameters. The camera position class can be inherited by the mutable camera position class. The camera position class can include functions, including: an initialization with target function with zoom, bearing, and viewing angle that is a designated initializer; a camera with target function with zoom that is a convenience constructor for the camera position class for a particular target and zoom level; a camera with latitude function with longitude and zoom that is a convenience constructor for the camera position class, as per the camera with target function with input zoom; a camera with target function with zoom, bearing, and viewing angle that is a convenience constructor for the camera position class with all camera properties as per the initialization with target function with inputs of zoom, bearing, and viewing angle; a camera with latitude function with longitude, zoom, bearing, and viewing angle that is a convenience constructor for the camera position class with latitude, longitude, and all other camera properties as per initialization with target function with zoom, bearing, and viewing angle; and a zoom at coordinate function with given meters and points that gets the zoom level at that meters distance at a given coordinate on Earth corresponds to the specified number of screen points. The camera position class can include the following properties: a target property that is the location on the Earth towards that the camera points; a zoom property that is the zoom level; a bearing property that provides the bearing of the camera in degrees clockwise from true north; a viewing angle property that provides the angle, in degrees, of the camera from the nadir (directly facing the Earth).

Camera Update Class: The camera update class can represent an update that may be applied to a map view class. The camera update class encapsulates some logic for modifying the current camera. The camera update class can include static public member functions such as a zoom in function that returns a camera update class that zooms in on the map; a zoom out function that returns a camera update class that zooms out on the map; a zoom by function that returns a camera update class that changes the zoom by the specified amount; a zoom to function that returns a camera update class that sets the zoom to the specified amount; a set target function that returns a camera update class that sets the camera target to the specified coordinate; a set target zoom function that returns a camera update class that sets the camera target and zooms to the specified values; a set camera function that returns a camera update class that sets the camera to the specified camera position class; a fit bounds function that returns a camera update function that transforms the camera such that the specified bounds are centered on screen at the greatest possible zoom level; a fit bounds with padding function that is similar to the fit bounds function but allows to specify the padding in order to insert the bounding box from the view's edges; a fit bounds with edge inserts function that is similar to the fit bounds function but allows to specify edge inserts in order to insert the bounding box from the view's edges; a scroll by X and Y function that returns a camera update class that shifts the center of the view by the specified number of points in the x and y directions; and a zoom by point function that returns a camera update class that zooms with a focus point that stays fixed on screen.

Circle Class: The circle class can be a circle on the Earth's surface (spherical cap). The circle class can be inherited by the overlay class. The circle class can include a circle with position and radius function that is a convenience constructor for the circle class for a particular position and radius. The circle class can include the following properties: a position property that provides the position on Earth of the center of the circle; a radius property that provides the radius of the circle in meters that must be positive; a stroke width property that provides the widths of the circle's outline in screen points; a stroke color property that provides the color of the circle's outline; a fill color property that provides the color with that the interior of the circle is painted with; a title property that provides a title, a short description of the overlay; a map property that provides the map the overlay is on; a tappable property that provides whether the overlay should cause tap notifications; a z index property that provides for a layering system in that higher z index valued overlays will be drawn on top of lower z index valued tile layers and overlays.

Coordinate Bounds Class: The coordinate bounds class can represent a rectangular bounding box on the Earth's surface. The coordinate bounds class can be immutable. The coordinate bounds class can include functions including an initialization with coordinate function that initializes the northeast and southwest bounds corresponding to the rectangular region defined by the two corners; an including coordinate function that returns a coordinate bounds class representing the current bounds extending to include the passed-in coordinate; an including bounds function that returns a coordinate bounds class representing the current bounds extended to include the entire other bounds; a contains coordinate function that returns YES if a passed-in coordinate is within the coordinate bounds class; an intersects bounds class that returns YES if a passed-in coordinate bounds class overlaps with the coordinate bounds class; an initialization with region function that initializes with bounds that encompass a region; an initialization with path function that initializes with bounds that encompass a path; and an including path function that returns a coordinate bounds class representing the current bounds extended to include path. The coordinate bounds class can include the following properties: a northeast property providing the northeast corner of the bounds; a southwest property providing the southwest corner of the bounds; a valid property providing whether the bound contains any points.

Geocoder Class: The geocoder class can expose a service for reverse geocoding that maps Earth coordinates (latitude and longitude) to a collection of addresses near that coordinate. The geocoder class can include functions including a reverse geocode coordinate completion handler function that reverses a geocode coordinate on the Earth's surface; and a geocoder function that is a convenience constructor for a geocoder class.

Ground Overlay Class: The ground overlay class can specify the available options for a ground overlay that exists on the Earth's surface. The position of a ground overlay can be specified explicitly and it may not face the camera. The ground overlay class can inherit the overlay class. The ground overlay class can include functions including a ground overlay with bounds and icon function that is a convenience constructor for the ground overlay class for a particular bounds and icon and a ground overlay with position and icon and zoom level function that constructs a ground overlay class that renders the given icon at position as if the image's actual size matches camera pixels at a zoom level. The ground overlay class can include the following properties: a position property that provides the position of this ground overlay class, more specifically the physical position of its anchor; an anchor property that specifies where the ground overlay class is anchored to the Earth in relation to bounds; an icon property that provides the icon to render within bounds on earth; an opacity property that provides the opacity of the ground overlay between 0 (completely transparent) and 1 (default) inclusive; a bearing property that provides the bearing of the ground overlay in degrees; a bounds property that provides the two-dimensional bounds on the earth in that the icon is drawn; a title property that provides a title, a short description of the overlay; a map property that provides the map this overlay is on; a tappable property that provides whether the overlay should cause tap notifications; a z index property that provides for a layering system in that higher z index valued overlays will be drawn on top of lower z index valued tile layers and overlays.

Indoor Building Class: The indoor building class can describe a building that contains levels. The indoor building class can include the following properties: a levels property that provides an array of indoor level classes describing the levels that make up the building; a default level index property that provides the index in the levels array of the default level; an underground property that provides whether the building is entirely underground and supports being hidden.

Indoor Display Class: The indoor display class can provide the ability to observe or control the display of indoor level data. The indoor display class may include the following properties: a delegate property that provides the indoor display class delegate; an active building property that provides the currently focused building and will be nil if there is no building with indoor data currently under focus; an active level property that provides and controls the active level for the active building.

Indoor Display Delegate Class: The indoor display delegate class can be a delegate for events on the indoor display class. The indoor display delegate class can include functions such as a change active building function that is raised when the active building is changed and a change active level function that is raised when the active level has changed.

Indoor Level Class: The indoor level class can describe a single level in a building. Multiple buildings can share a level in that case the level instances will compare as equal even though the level numbers and/or names may be different. The indoor level class can include the following properties: a name property that provides a localized display name for the level; a short name property that provides a localized short display name for the level.

Map Layer Class: The map layer class can be a custom subclass of CALayer class provided as the layer class on the map view class. The map layer class can inherit CALayer class.

Map View Class: The map view class can be considered to be a primary class of the map API and can be entry point for all methods related to the map. The map view class is typically instantiated using a convenience constructor but may also be created with a default method wherein the camera will be set to a default location. The map view class can include functions including a start rendering function that tells the map to power up its renderer; a stop rendering function that tells the map to power down its renderer; a clear function that clears all markup that has been added to the map including markers and polylines and ground overlays; a set min and max zoom function that sets the maximum and minimum zoom; a camera for bounds insets function that builds a camera position class that presents bounds with padding; a move camera function that changes the camera according to a camera update class, an equal rendering position class that checks wither the given camera positions would practically cause the camera to be rendered the same by taking into account the level of precision and transformations used internally; an animate to camera position function that animates the camera of the map to a camera position class, an animate to location class that is similar to the animate to camera position function but that changes only the location of the camera; an animate to zoom function that is similar to the animate to camera position function but that changes only the zoom level of the camera; an animate to bearing function that is similar to the animate to camera position function but that changes only the bearing of the camera; an animate to viewing angle function that is similar to the animate to camera position function but that changes only the viewing angle of the camera; an animate with camera update function that applies a camera update class to the current camera and then uses the result as in the animate to camera position function; and a map with frame and camera function that builds and returns a map view class with a frame and camera target. The map view class can include the following properties: a delegate property that provides a map view class delegate; a camera property that controls the camera and defines how the map is oriented; a projection property that returns a project class object that can convert between screen coordinates and latitude/longitude coordinates; a location enabled property that controls whether the location dot and accuracy circle are enabled; a location parameter that reveals whether the user location dot is being drawn if location is enabled; a selected market property that provides the marker that is selected; a traffic enabled property that controls whether the map is drawing available traffic data; a map type property that controls the type of map tiles that should be displayed; a map style property that controls the style of the map; a min zoom property that provides the farthest the camera can be zoomed out; a max zoom property that provides the closest the camera may be to the Earth; a buildings enabled property that provides whether to show three-dimensional buildings where available; an indoor enabled property that provides whether indoor maps are shown where available; an indoor display property that provides the indoor display class instance that allows to observe or control aspects of indoor data display; a setting property that provides the UI settings class object that controls user interface settings for the map; a padding property that controls the visible region of the view; an accessibility elements hidden property that provides whether to show accessibility elements; a layer property that provides the accessor for the custom CALayer type used for the layer; a preferred frame rate property that controls the rendering frame rate; a navigation enabled property that provides whether navigation functionality is enabled for this map; a navigator property that provides the navigator for the map view class that allows routes to be requested and turn-by-turn guidance to be started; a camera mode property that changes the mode of the camera if navigation is enabled; a following perspective property that provides the camera perspective that will be used when following a user's location.

Map View Delegate Class: The map view delegate class can be the delegate for events on a map view class. The map view delegate class can include functions including a map view will move function that is called before a camera on a map changes due to a gesture or animation or by being updated explicitly via the camera or a zero-length animation on a layer; a map view did change camera position function that can be called repeatedly during any animation or gestures on the map or only once if the camera is explicitly set; a map view idle at camera position function that is called when the map becomes idle after any outstanding gestures or animations have completed or after the camera has been explicitly set; a map view did tap at coordinate function that can be called after a tap gesture at a particular coordinate if a marker was not tapped; a map view did long press at coordinate function that can be called after a long-press gesture at a particular coordinate; a map view did tap marker function that can be called after a marker is tapped; a map view did tap info window of marker function that can be called after the information window associated with a marker has been tapped; a map view did long press info window of marker function that can be called after a marker's info window has been long pressed; a map view did tap overlay function that can be called after an overlay has been tapped; a map view did tap POI function that can be called after a point of interest has been tapped; a map view marker info window function that can be called when a marker is about to become selected that provides an optional custom info window to use for that marker if the method returns a UI view; a map view marker info contents function that can be called when the map view marker info window function returns nil; a map view did close info window of marker function that can be called when the information window associated with a marker is closed; a map view did begin dragging marker function that can be called when dragging has been initiated on a marker; a map view did end dragging marker function that can be called when dragging of a marker has ended; a map view did drag marker function that can be called while the marker is being dragged; a did tap my location button for map view function that can be called when the location button is tapped; a map view did start tile rendering function that can be called when tiles have been requested and started rendering; a map view did finish tile rendering function that can be called when all tiles have loaded or failed permanently and labels have rendered; and a map view snapshot ready function that is called when the map is stable wherein all tiles have loaded and all labels have rendered and the camera is idle and all overlay objects have been rendered.

Marker Class: The marker class can be an icon placed at a particular point on the map's surface. The marker class's icon is drawn oriented against the viewing device's screen rather than the map's surface; i.e., it will not necessarily change orientation due to map rotations, tilting, or zooming. The marker class can inherit the overlay class. The marker class can include functions including a marker with position class that can be a convenience constructor for a default marker and a marker image with color class that can create a tinted version of the default marker image for use as an icon. The marker class can include the following properties: a position property that provides the marker position; a snippet property that provides snippet text that can be shown beneath the title in the info window when selected; an icon property that provides a marker icon to render; an icon view property that provides a marker view to render; a tracks view changes property that controls whether the icon for this marker should be redrawn every frame; a tracks info window changes property that controls whether the info window for a the marker should be redrawn every frame; a ground anchor property that provides for the ground anchor that specifies the point in the icon image that is anchored to the marker's position on the Earth's surface; an info window anchor property that specifies the point in the icon image at that to anchor the info window that can be displayed directly above the point; an appear animation property that controls the animation used when the marker is placed on a map view class; a draggable property that controls whether the marker can be dragged interactively; a flat property that controls whether the marker should be flat against the Earth's surface or a billboard facing the camera; a rotation property that provides the rotation of the marker in degrees clockwise about the marker's anchor point; an opacity property that provides the opacity of the marker between 0 that is completely transparent or 1 that is default, inclusive; a user data property providing marker data; a layer property that provides the core animation layer for the marker class; a panorama view property that provides that panorama view will attempt to show the marker; a title property that provides a title, a short description of the overlay; a map property that provides the map this overlay is on; a tappable property that provides whether the overlay should cause tap notifications; a z index property that provides for a layering system in that higher z index valued overlays will be drawn on top of lower z index valued tile layers and overlays.

Marker Layer Class: The marker layer class can be a custom subclass of CALayer available on a per-marker basis that allows animation of several properties of its associated marker class. The marker layer class can include the following properties: a latitude property providing the latitude part of position on the marker class; a longitude property providing the longitude part of position on the marker class; a rotation property providing rotation as per the marker class; an opacity parameter providing opacity as per the marker class.

Mutable Camera Position Class: The mutable camera class can be a mutable version of the camera position class that can inherit the camera position class. The mutable camera position class can include functions, including an initialization with target function with zoom, bearing, and viewing angle that is a designated initializer; a camera with target function with zoom that is a convenience constructor for the mutable camera position class for a particular target and zoom level, a camera with latitude function with longitude and zoom that is a convenience constructor for the mutable camera position class, as per the camera with target function with input zoom, a camera with target function with zoom, bearing, and viewing angle that is a convenience constructor for the mutable camera position class with all camera properties as per the initialization with target function with inputs of zoom, bearing, and viewing angle, a camera with latitude function with longitude, zoom, bearing, and viewing angle that is a convenience constructor for the mutable camera position class with latitude, longitude, and all other camera properties as per initialization with target function with zoom, bearing, and viewing angle, and a zoom at coordinate function with given meters and points that gets the zoom level at that meters distance at a given coordinate on Earth corresponds to the specified number of screen points. The mutable camera position class can include the following properties: a target property that is the location on the Earth towards that the camera points; a zoom property that is the zoom level; a bearing property that provides the bearing of the camera in degrees clockwise from true north; a viewing angle property that provides the angle, in degrees, of the camera from the nadir (directly facing the Earth).

Mutable Path Class: The mutable path class can be a dynamic array of location coordinates in that all coordinates are typically valid. The mutable path class can be the mutable counterpart to the immutable path class that can inherit the path class. The mutable path class can include public member functions including an add coordinate function that adds a coordinate at the end of the path, an add latitude and longitude function that adds a new location with the given latitude and longitude, an insert coordinate at index function that inserts the coordinate at the given index, a replace coordinate at index with coordinate function that replaces a coordinate at a given index with a given coordinate, a remove coordinate at index function that removes an entry at an index, a remove last coordinate function that removes the last coordinate of the path, a remove all coordinates function that removes all coordinates in the path, an initialization with path function that initializes a newly allocated path with the contents of another path, a count function that gets the size of the path, a coordinate at index function that returns the location at the given index if it is valid, an encoded path function that returns an encoded string of the path, a path offset by latitude and longitude function that returns a new path obtained by adding the given latitude and longitude to each coordinate of the current path, a segment for length and kind function that returns the fractional number of segments along the path that corresponds to length interpreted according to kind, a length of kind function that returns the length of the path according to kind, a path function that is a convenience constructor for an empty path, and a path from encoded path that initializes a newly allocated path from an encoded path.

Navigation Waypoint Class: The navigation waypoint class can be an immutable waypoint class used to specify navigation destinations. The navigation waypoint class generally can be initialized from a location or an identification number and so it has two designated initializers. The navigation waypoint class can include public member functions including an initializer with location and title and an initializer with a place ID and title. The navigation waypoint class can also include a title property that provides the name of the waypoint.

Orientation Class: The orientation class can be a tuple of heading and pitch used to control the viewing direction of a panorama camera class. The orientation class may contain such public attributes as a heading, a horizontal angle in degrees, and a pitch, a vertical angle from the horizon in degrees.

Overlay Class: The overlay class can be an abstract class that represents some overlay that may be attached to a specific map view class. The overlay class may not instantiated directly; instead, instances of concrete overlay types are typically created directly. The overlay class may support a copying protocol that may return a copy of the overlay type but with a nil map. The overlay class may be inherited by the circle class, ground overlay class, marker class, polygon class, and polyline class. The overlay class may contain the following properties: a title property providing a title, a short description of the overlay; a map property that provides the map this overlay is on; a tappable property that provides whether the overlay should cause tap notifications; a z index property that provides for a layering system in that higher z index valued overlays will be drawn on top of lower z index valued tile layers and overlays.

Panorama Class: The panorama class can represent metadata for a specific panorama on the Earth. The panorama class may contain the following properties: a coordinate property that provides the precise location of the panorama; a panorama ID that provides the ID of the panorama; a links property that provides an array of panorama link classes describing the neighboring panoramas.

Panorama Camera Class: The panorama camera class can be used to control the viewing direction of a panorama view class. The panorama camera class can include functions including an initialization function with orientation, zoom, and field of view, a camera with orientation and zoom function that is a convenience constructor specifying heading and pitch as part of orientation plus zoom and a default field of view, a camera with heading pitch and zoom function that is a convenience constructor specifying heading and pitch and zoom with a default field of view, a camera with orientation zoom and field of view that is a convenience constructor for the panorama camera class specifying all camera properties with heading and pitch as part of orientation, and a camera with heading pitch zoom and field of view function that is a convenience constructor for the panorama camera class specifying all camera properties. The panorama camera class can include the following properties: a FOV (field of view) property providing the field of view encompassed by the larger dimension of the view in degrees at zoom 1; a zoom property providing to adjust the visible region of the screen; an orientation property providing the camera orientation that groups together heading and pitch.

Panorama Camera Update Class: The panorama camera update class can represent an update that may be applied to a panorama view class that encapsulates some logic for modifying the current camera. The panorama camera update class may include functions including a rotate by function that returns an update that increments the camera heading, a set heading function that returns an update that sets the camera heading to a given value; a set pitch function that returns an update that sets the camera pitch to a given value, and a set zoom function that returns an update that sets the camera zoom to a given value.

Panorama Layer Class: The panorama layer class can be a custom subclass of CALayer provided as the layer class on a panorama view class. The panorama layer class can inherit the CALayer class. The panorama layer class may include properties such as a camera heading, camera pitch, camera zoom, and camera FOV.

Panorama Link Class: The panorama link class can link from a panorama class to neighboring panoramas. The panorama link class can include the following properties: a heading property providing the angle of a neighboring panorama typically clockwise from north in degrees; a panorama ID property providing a panorama ID for a neighboring panorama.

Panorama Service Class: The panorama service class can be used to request panorama metadata even when a panorama view is not active. The panorama service class can include public member functions including a request panorama near coordinate function that retrieves information about a panorama near the given coordinate, a request panorama near coordinate with radius function that is similar to the request panorama near coordinate function but allows to specify a search radius around the coordinate, and a request panorama with ID function that retrieves information about a panorama with the given ID.

Panorama View Class: The panorama view class can be used to display street view imagery. The panorama view class can include functions including a set all gestures enabled function that sets the preference for whether all gestures should be enabled or disabled, an animate to camera function that animates the camera to a location over a duration, an update camera function that modifies the camera according to a camera update class over a specified duration, a move near coordinate function that requests a panorama near a coordinate, a move near coordinate function with radius that is similar to the move near coordinate function but allows to specify a search radius around coordinate, a point for orientation function that returns the screen point the orientation points through for the current view, an orientation for point function that returns the current camera orientation pointing through a screen location given a point for the view, a panorama with frame convenience constructor that searches for and displays a panorama near coordinate, and a panorama with frame and radius convenience constructor that is similar to the panorama with frame convenience constructor but allows to specify a search radius around the coordinate. The panorama view class can include the following properties: a panorama property providing the panorama display wherein setting the panorama property transitions to a new panorama; a delegate property providing a delegate for the panorama view; an orientation gestures property controlling whether orientation gestures are enabled or disabled; a zoom gestures property that controls whether zoom gestures are enabled or disabled; a navigation gestures property that controls whether navigation gestures are enabled or disabled; a navigation links hidden property that controls whether the tappable navigation links are hidden or visible; a street names hidden property that controls whether the street name overlays are hidden or visible; a camera property that controls the panorama's camera; a layer property that provides an accessor for the custom CALayer type used for the layer.

Panorama View Delegate Class: The panorama view delegate class can be a delegate for events on the panorama view class. The panorama view delegate class can include functions including a will move to panorama ID function that is called when starting a move to another panorama, a did move to panorama function that is invoked every time the view.panorama property changes, a did move to panorama near coordinate function that is called when the panorama change was caused by invoking the move to panorama near coordinate function, an error on move near coordinate function that is called when the move near coordinate function produces an error, an error on move to panorama ID function that is called when the move to panorama ID function produces an error, a did move camera function that called repeatedly during changes to the camera, a did tap function that is called when a user has tapped on the panorama view, but this tap was not consumed (taps may be consumed by e.g. tapping on a navigation arrow), a did tap marker function that is called after a marker has been tapped, a did start rendering function that is called when the panorama tiles for the current view have just been requested and are beginning to load, and a did finish rendering function that is called when the tiles have been loaded and rendered on screen or permanently failed to load.

Path Class: The path class can encapsulate an immutable array of two-dimensional coordinates. The path class can be inherited by the mutable path class. The path class can include functions including an initialization function with initializes a newly allocated path with the contents of another path class, a count function that gets the size of the path, a coordinate at index function that returns the location at the given index if it is valid, an encoded path function that returns an encoded string of the path, a path offset by latitude and longitude function that returns a new path obtained by adding the given latitude and longitude to each coordinate of the current path, a segment for length and kind function that returns the fractional number of segments along the path that corresponds to length interpreted according to kind, a length of kind function that returns the length of the path according to kind, a path function that is a convenience constructor for an empty path, and a path from encoded path that initializes a newly allocated path from an encoded path.

Polygon Class: The polygon class can define a polygon that appears on the map. A polygon (like a polyline) defines a series of connected coordinates in an ordered sequence; additionally, polygons form a closed loop and define a filled region. The polygon class can inherit the overlay class. The polygon class can include a polygon with path static function that is a convenience constructor for a polygon class for a particular path. The polygon class can include the following properties: a path property that provides the path that describes the polygon; a holes property that provides the array of path instances that describe any holes in this polygon; a stroke width property that provides the width of the polygon outline in screen points; a stroke color property that provides the color of the polygon outline; a fill color property that provides the fill color; a geodesic property that provides whether the polygon should be rendered with geodesic correction; a title property providing a title, a short description of the overlay; a map property that provides the map this overlay is on; a tappable property that provides whether the overlay should cause tap notifications; a z index property that provides for a layering system in that higher z index valued overlays will be drawn on top of lower z index valued tile layers and overlays.

Polyline Class: The polyline class can specify the available options for a polyline that exists on the Earth's surface, typically drawn as a physical line between points specified in the path property. The polyline class can inherit the overlay class. The polyline class can include a polyline with path function that is a convenience constructor for a polyline class for a particular path. The polyline class can include the following properties: a path property that provides the path that describes the polyline; a stroke width property that provides the width of the line in screen points; a stroke color property that provides the color of the line; a geodesic property that provides whether the polyline should be rendered with geodesic correction; a spans property providing an array containing a style span class used to render the polyline; a title property providing a title, a short description of the overlay; a map property that provides the map this overlay is on; a tappable property that provides whether the overlay should cause tap notifications; a z index property that provides for a layering system in that higher z index valued overlays will be drawn on top of lower z index valued tile layers and overlays.

Projection Class: The projection class can define a mapping between Earth coordinates and coordinates in the map's view. The projection class can include functions including a point for coordinate function that maps an Earth coordinate to a point coordinate in the map's view, a coordinate for point function that maps a point coordinate in the map's view to an Earth coordinate, a points at coordinate function that converts a distance to content size, a contains coordinate function that returns whether a given coordinate is contained within the projection, and a visible region function that returns the region that is visible according to the projection.

Reverse Geocode Response Class: The reverse geocode response class can be a collection of results from a reverse geocode request. The reverse geocode response class can include functions including a first result function that returns the first result or nil if no results were available and a results function that returns an array of all the results including the first result.

Service Class: The service class can include static public member functions including a shared services method that provides a shared instance of the service class for the maps API, creating it if necessary, a provide API key method that provides a key to the maps API, an open source license info method that returns the open source software license information, and a version method that returns the version of release of the maps API.

Stroke Style Class: The stroke style class can describe the drawing style for one-dimensional entities such as polylines. The stroke style class can functions including a solid color function that creates a solid color stroke style and a gradient from color to color method that creates a gradient stroke style interpolating from one color to another.

Style Span Class: The style span class can describe the style for some region of a polyline. The style span class can include factory functions including a span with color method that returns a solid color span of one segment length, a span with color segments method that returns a solid color span with a given number of segments, a span with style method that returns a span with the given style of length one segment, and s span with style segments method that returns a span with the given style and length in number of segments. The style span class can include the following properties: a style property providing the style of the span; a segments property providing the length of the span in number of segments.

Sync Tile Layer Class: The sync tile layer class can be an abstract subclass of the tile layer class the provides a sync interface to generate image tile data. The sync tile layer class can inherit the tile layer class. The sync tile layer class can include functions including a request tile for x y zoom receiver method that generates image tiles for a tile overlay, a tile for x y zoom method that is similar to request tile for x y zoom receiver method but provides a synchronous interface to return tiles, and a clear tile cache method that clears the cache so that all tiles will be requested again. The sync tile layer class can include the following properties: a map property that provides the map this overlay is on; a z index property that provides for a layering system in that higher z index valued overlays will be drawn on top of lower z index valued tile layers and overlays; a tile size property that specifies the number of pixels that the returned tile images will prefer to display as; an opacity property that specifies the opacity of the tile layer; a fade in property that specifies whether the tiles should fade in.

Tile Layer Class: The tile layer class can be an abstract class that allows overlaying of custom image tiles on a specified map view class. The tile layer class can be inherited by the sync tile layer class and URL tile layer class. The tile layer class can include functions including a request tile for x y zoom receiver method that generates image tiles for a tile overlay and a clear tile cache method that clears the cache so that all tiles will be requested again. The tile layer class can include the following properties: a map property that provides the map this overlay is on; a z index property that provides for a layering system in that higher z index valued overlays will be drawn on top of lower z index valued tile layers and overlays; a tile size property that specifies the number of pixels that the returned tile images will prefer to display as; an opacity property that specifies the opacity of the tile layer; a fade in property that specifies whether the tiles should fade in.

Tile Receiver Class: The tile receiver class can be provided to the tile layer class when a tile request is made, allowing the callback to be later or immediately invoked. The tile receiver class can contain the receive tile with x y zoom image public member function that behaves as in the tile layer class.

URL Tile Layer Class: The URL tile layer class can fetch tiles based on the URLS returned from a constructor. The URL tile layer class can inherit the tile layer class. The URL tile layer class can include functions including a request tile for x y zoom receiver method that generates image tiles for a tile overlay, a clear tile cache method that clears the cache so that all tiles will be requested again, and a tile layer with URL convenience constructor. The URL tile layer class can include the following properties: a user agent property to provide a user agent for an application, a map property that provides the map this overlay is on; a z index property that provides for a layering system in that higher z index valued overlays will be drawn on top of lower z index valued tile layers and overlays; a tile size property that specifies the number of pixels that the returned tile images will prefer to display as; an opacity property that specifies the opacity of the tile layer; a fade in property that specifies whether the tiles should fade in.

Visible Region Class: The visible region class can contain the four points defining a polygon that is visible in a map's camera. The polygon can be a trapezoid instead of a reactance because a camera can have tilt. If the camera is directly over the center of the camera, the shape is rectangular, but if the camera is tilted, the shape will appear to be a trapezoid whose smallest side is closest to the point of view. The visible region class may include public attributes such as a near left attribute that may be the bottom left corner of the camera, a near right attribute that may be the bottom right corner of the camera, a far left attribute that may be the far left corner of the camera, and a far right attribute that may be the far right corner of the camera.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A non-transitory computer-readable medium storing instructions that implement an application programming interface for obtaining navigation information for a software application executed on an iOS computing device implementing an iOS operating platform, the computing device having one or more processors and a display, device, the application programming interface comprising:
   a first set of instructions associated with a map view class, wherein the map view class specifies a plurality of functions to display a map associated with a navigation service of the software application, wherein the navigation service is configured to provide navigation information associated with the software application, and wherein the plurality of functions to display the map comprise controlling one or more instances of the map view class; and
   a second set of instructions associated with a navigator class, wherein the navigator class is associated with the application programming interface and specifies a plurality of functions to control the implementation of the navigation service by the software application; and
   wherein the plurality of functions to control the implementation of the navigation service comprise controlling one or more instances of the map view class.

2. The non-transitory computer-readable medium of claim 1, further comprising:
providing, by the one or more processors, an application programming interface key to a services class upon launch of the software application, wherein the services class is associated with a maps application programming interface.

3. The non-transitory computer-readable medium of claim 2, wherein the services class comprises a shared services function to share an instance of the services class with the maps application programming interface.

4. The non-transitory computer-readable medium of claim 1, wherein one or more portions of the map view class are part of a maps application programming interface.

5. The non-transitory computer-readable medium of claim 1, wherein instantiating, by one or more processors, a map view class used to display a map comprises:
instantiating, by the one or more processors, the map view class using a convenience constructor.

6. The non-transitory computer-readable medium of claim 1, wherein controlling the map comprises controlling the display of routes and navigation user interface elements in conjunction with the map.

7. The non-transitory computer-readable medium of claim 1, wherein the application programming interface comprises a third set of instructions associated with a map view delegate class, wherein the map view class is specified as a delegate for events of the map view class.

8. The non-transitory computer-readable medium of claim 7, wherein the map view delegate class comprises a set min and max zoom function to set a minimum zoom and a maximum zoom for the map.

9. The non-transitory computer-readable medium of claim 1, wherein the application programming interface comprises a fourth set of instructions associated with a navigator delegate protocol, wherein the navigator delegate protocol is specified as a delegate of the navigator class, and wherein the navigator delegate protocol is configured to implement one or more calls to update the navigation information associated with the navigation service.

10. The non-transitory computer-readable medium of claim 1, wherein the application programming interface comprises a fifth set of instructions associated with a camera update class used to modify a camera used to view the map.

11. The non-transitory computer-readable medium of claim 10, wherein the plurality of functions to display the map comprise a move camera function that changes a position of the camera according to the camera update class.

12. The non-transitory computer-readable medium of claim 1, wherein the application programming interface comprises a sixth set of instructions associated with a user interface (UI) settings class, and wherein the UI settings class specifies one or more parameters to control a user interface associated with the navigation service.

13. A method for integrating a navigation service as part of a software application using an application programming interface on a iOS computing device having one or more processors, the computing device implementing an iOS operating system, the method comprising:
instantiating, by one or more processors, a map view class, wherein the map view class specifies a plurality of functions to display a map associated with a navigation service of the software application, wherein the navigation service is configured to provide navigation information associated with the software application, and wherein the plurality of functions to display the map comprises controlling one or more instances of the map view class;
creating, by the one or more processors, one or more instances of a navigator class associated with the application programming interface, wherein the navigator class specifies a plurality of functions to control the implementation of a navigation service by the software application, and wherein the plurality of functions to control the implementation of the navigation service comprise controlling one or more instances of the map view class; and
controlling, by the one or more processors, the map using the one or more instances of the navigator class.

14. The method of claim 13, further comprising:
providing, by the one or more processors, an application programming interface key to a services class upon launch of the software application, wherein the services class is associated with a maps application programming interface.

15. The method of claim 14, wherein the services class comprises a shared services function to share an instance of the services class with the maps application programming interface.

16. The method of claim 14, wherein the map view class is provided as part of a maps application programming interface.

17. The method of claim 13, wherein instantiating, by one or more processors, a map view class used to display a map comprises:
instantiating, by the one or more processors, the map view class using a convenience constructor.

18. The method of claim 13, wherein controlling the map comprises controlling the display of routes and navigation user interface elements in conjunction with the map.

19. A computing device implementing an iOS operating system, comprising:
a display device;
one or more processors; and
one or more memory devices, wherein the one or more memory devices store computer-readable instructions that implement an application programming interface invoked by a software application to obtain navigation information to provide a navigation service as part of the software application, the instructions comprising:
a first set of instructions associated with a map view class, wherein the map view class specifies a plurality of functions to display a map associated with a navigation service of the software application, wherein the navigation service is configured to provide navigation information associated with the software application, and wherein the plurality of functions to display the map comprise controlling one or more instances of the map view class; and
a second set of instructions associated with a navigator class, wherein the navigator class is associated with the application programming interface and specifies a plurality of functions to control the implementation of the navigation service by the software application, and wherein the plurality of functions to control the implementation of the navigation service comprise controlling one or more instances of the map view class.

20. The computing device of claim 19, wherein controlling the map comprises controlling the display of routes and navigation user interface elements in conjunction with the map.

* * * * *